United States Patent
Abe et al.

(10) Patent No.: US 6,472,484 B1
(45) Date of Patent: Oct. 29, 2002

(54) PROCESSES FOR PRODUCING POLYOLEFIN COMPOSITION

(75) Inventors: Shinji Abe; Tomohiro Arase; Satoru Ohtani, all of Ichihara; Shotaro Matsuda, Yamaguchi, all of (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/937,479

(22) PCT Filed: Mar. 28, 2001

(86) PCT No.: PCT/JP01/02585

§ 371 (c)(1),
(2), (4) Date: Sep. 26, 2001

(87) PCT Pub. No.: WO01/74920

PCT Pub. Date: Oct. 11, 2001

(30) Foreign Application Priority Data

Mar. 31, 2000 (JP) ........................................ 2000-101296
Apr. 6, 2000 (JP) ........................................ 2000-110549
Jul. 3, 2000 (JP) ........................................ 2000-200527

(51) Int. Cl.[7] ................................................. C08F 2/34
(52) U.S. Cl. ............................ 526/201; 526/67; 526/68; 526/65; 526/129; 526/352; 526/348.2; 526/348.6; 526/348.5; 526/901
(58) Field of Search .......................... 526/68, 901, 129, 526/352, 348.2, 348.5, 348.6, 201, 67, 65

(56) References Cited

U.S. PATENT DOCUMENTS

| | | | |
|---|---|---|---|
| 5,047,468 A | * | 9/1991 | Lee et al. ...................... 526/65 |
| 5,321,106 A | | 6/1994 | LaPointe |
| 5,468,810 A | | 11/1995 | Hayakawa et al. |
| 6,025,448 A | * | 2/2000 | Swindoll et al. ............ 526/127 |

FOREIGN PATENT DOCUMENTS

| | | |
|---|---|---|
| JP | 56061418 | 5/1981 |
| JP | 1-501950 | 7/1989 |
| JP | 1-502036 | 7/1989 |
| JP | 2-276807 | 11/1990 |
| JP | 3-179005 | 8/1991 |
| JP | 3-179006 | 8/1991 |
| JP | 3-207703 | 9/1991 |
| JP | 3-207704 | 9/1991 |
| JP | 11012336 | 1/1999 |

* cited by examiner

Primary Examiner—David W. Wu
Assistant Examiner—William K Cheung
(74) Attorney, Agent, or Firm—Birch, Stewart, Kolasch & Birch, LLP (57) ABSTRACT

The present invention provides a method for producing a polyolefin composition having a narrow composition distribution and is characterized in that when at least two olefins are copolymerized in the presence of a transition metal compound catalyst using at least two gas phase fluidized bed reactors, a saturated aliphatic hydrocarbon is allowed to exist in each reactor in a concentration from 0.1 to 30 mol %, and the ratio of the concentration ($C_2$) of a saturated aliphatic hydrocarbon in a reactor of a second stage to the concentration ($C_1$) of a saturated aliphatic hydrocarbon in a reactor of a first stage ($C_2/C_1$) is 0.13 or more. Further, the present invention provides a method for producing a polyolefin composition by multi-stage polymerization, which can prevent sheeting in the reactor and can give a polyolefin composition stably with high productivity, and is characterized in that a saturated aliphatic hydrocarbon is allowed to exist in a transport line for transporting a polymer particle extracted from a fluidized bed reactor in the previous stage to a fluidized bed reactor in the subsequent stage at a concentration from 0.1 to 30 mol %.

9 Claims, 1 Drawing Sheet

Fig. 1

PROCESSES FOR PRODUCING POLYOLEFIN COMPOSITION

This application is the national phase under 35 U.S.C. § 371 of PCT International Application No. PCT/JP01/02585 which has an international filing date of Mar. 28, 2001, which designated the United States of America.

TECHNICAL FIELD

The present invention relates to a method of producing a polyolefin composition using at least two gas phase fluidized bed reactors in co-existence with a saturated aliphatic hydrocarbon, and a method of producing a polyolefin composition wherein a saturated aliphatic hydrocarbon is allowed to exist when transporting a polymer particle from a reactor in the previous stage to a reactor in the subsequent stage.

BACKGROUND ART

Polyolefins, for example, linear low density polyethylenes which are a copolymer of ethylene with an α-olefin (hereinafter, referred to as "LLDPE" in some cases) have various properties such as excellent heat seal properties, flexibility and toughness, excellent water-resistance, moisture-resistance and chemical-resistance, lower cost, and the like, and are widely used conventionally as materials for molding films and as industrial materials, and the like.

LLDPE is usually produced by copolymerizing ethylene with an α-olefin at low pressure in the presence of a transition metal compound catalyst such as a Ziegler catalyst and the like, and as the polymerization method, liquid phase polymerization methods such as solution polymerization, slurry polymerization and the like, and gas phase polymerization methods are used. Production of polyolefins such as LLDPE and the like by a gas phase polymerization method is industrially advantageous since a polymer is obtained in the form of a particle and consequently the production process can be simplified as compared to a liquid polymerization method requiring the steps of precipitating and separating a particle from a polymerization solution, and the like.

Further, LLDPEs having a narrow molecular weight distribution are desired since they can provide films having excellent molding properties and the like.

The present inventors have studied, under such conditions, a method of producing polyolefins such as LLDPE and the like according to a gas phase polymerization method, and resultantly, have found that LLDPE having a narrow molecular weight distribution is obtained at high yield if copolymerization such as ethylene with an α-olefin using at least two gas phase fluidized bed reactors is so conducted that the concentration of a saturated aliphatic hydrocarbon in a reactor is in a specific range and the ratio of the concentration in a reactor of a first stage to the concentration in a reactor of a second stage is in a specific range.

Further, when a polyolefin composition is produced using a multi-stage gas phase polymerization apparatus composed of at least to gas phase fluidized bed reactors as described above, a polymer particle sometimes clogs a transport line for transporting a polymer particle extracted from a reactor in the previous stage to a reactor in the subsequent stage, which obstructs the line.

As the means for solving such a problem, a method is used in which an antistatic agent is added to a transport line, however, catalytic activity in the subsequent stage may decrease, in this method.

The present inventors have investigated, under such a condition, a method of preventing obstruction of a line occurring in producing a polyolefin composition by a multi-stage gas phase polymerization method, and resultantly found that obstruction of a line can be prevented if a specific amount of saturated aliphatic hydrocarbon is allowed to exist in an extraction line and transport line, leading to completion of the present invention.

DISCLOSURE OF INVENTION

The method of producing a polyolefin composition of the present invention is a method of producing a polyolefin composition comprising copolymerizing at least two olefins selected from ethylene and α-olefins having 3 to 20 carbon atoms using at east two gas phase fluidized bed reactors in the presence of a transition metal compound catalyst, wherein copolymerization of the reactor in a second or later stage is conducted in the presence of a copolymer produced in the previous stage, and is characterized by that a saturated aliphatic hydrocarbon exists in each reactor in a concentration from 0.1 to 30 mol %, and the ratio of the concentration ($C_2$) of a saturated aliphatic hydrocarbon in a reactor of a second stage to the concentration ($C_1$) of a saturated aliphatic hydrocarbon in a reactor of a first stage ($C_2/C_1$) is 0.13 or more.

The method of producing a polyolefin composition of the present invention comprises an embodiment in which a saturated aliphatic hydrocarbon having 2 to 10 carbon atoms is introduced to a fluidized bed of each reactor so that the concentration thereof in a reactor is in the range from 0.1 to 20 mol % and the ratio of a concentration ($C_2$) of the saturated aliphatic hydrocarbon in a reactor of a second stage to a concentration ($C_1$) of the saturated aliphatic hydrocarbon in a reactor of a first stage ($C_2/C_1$) is 0.13 or more, and ethylene and an α-olefin having 3 to 20 carbon atoms are copolymerized in the presence of a metallocene-based supporting catalyst, to produce a linear low density polyethylene composition.

According to the present invention, it is preferable to produce a polyethylene of a higher molecular weight having a melt index in the range from 0.01 to 50 g/10 min. and a density in the range from 0.860 to 0.950 g/cm$^3$ in one reactor, and to produce a polyethylene of a lower molecular weight having a melt index in the range from 0.5 to 3000 g/10 min. and a density in the range from 0.900 to 0.975 g/cm$^3$ in another reactor, to give a composition in which the weight ratio of the polyethylene of a higher molecular weight to the polyethylene of a lower molecular weight is in the range from 30:70 to 80:20, and it is also preferable to produce a polyethylene of a higher molecular weight having a melt index in the range from 0.01 to 50 g/10 min. and a density in the range from 0.860 to 0.950 g/cm$^3$ in a reactor of a first stage, and to produce a polyethylene of a lower molecular weight having a melt index in the range from 0.5 to 3000 g/10 min. and a density in the range from 0.900 to 0.975g/cm$^3$ in a reactor of a second stage, to give a composition in which the weight ratio of the polyethylene of a higher molecular weight to the polyethylene of a lower molecular weight is in the range from 30:70 to 80:20.

In the present invention, it is preferable to conduct copolymerLzation at a temperature in the range from the dew point of a mixed gas containing a polymerization monomer and the above-mentioned saturated aliphatic hydrocarbon present in a fluidized bed of a reactor of a first stage to a temperature 5° C. higher than the dew point, and it is preferable that the ratio of a concentration $C_2$ of a saturated aliphatic hydrocarbon in a reactor of a second stage to a concentration $C_1$ of a saturated aliphatic hydrocarbon in a reactor of a first stage ($C_2/C_1$) is in the range from 0.13 to 20.

Further, in the present invention, it is preferable to conduct copolymerization while controlling the concentration of a saturated aliphatic hydrocarbon in a mixed gas in one reactor to be higher than the concentrations of saturated aliphatic hydrocarbons in mixed gases in reactors of the previous stage.

The method of producing a polyolefin composition according to another embodiment of the present invention is a method of producing a polyolefin composition comprising polymerizing or copolymerizing at least one olefin selected from ethylene and α-olefins having 3 to 20 carbon atoms using at least two gas phase fluidized bed reactors, wherein a saturated aliphatic hydrocarbon is allowed to exist in a transport line for transporting a polymer particle extracted from a fluidized bed reactor in the previous stage to a fluidized bed reactor in the subsequent stage, and the concentration of a saturated aliphatic hydrocarbon in the transport line is in the range from 0.1 to 30 mol %.

In the present invention, it is preferable that all or a part of the above-mentioned saturated aliphatic hydrocarbon is fed to a fluidized bed reactor, and introduced into a transport line together with a polymer particle.

BEST MODE FOR CARRYING OUT THE INVENTION

The method of producing a polyolefin composition according to the present invention will be specifically illustrated below.

In a method of producing a polyolefin composition according to one embodiment of the present invention, when a polyolefin composition is produced by copolymerizing at least two olefins selected from the group consisting of ethylene and α-olefins having 3 to 20 carbon atoms (hereinafter, these are together called "olefin", in some cases) using at least two gas phase fluidized bed reactors in the presence of a transition metal compound catalyst and in the presence of a copolymer produced in the previous stage, in a reactor of a second or later stage, a saturated aliphatic hydrocarbon is allowed to exist in each reactor.

Figure 1:
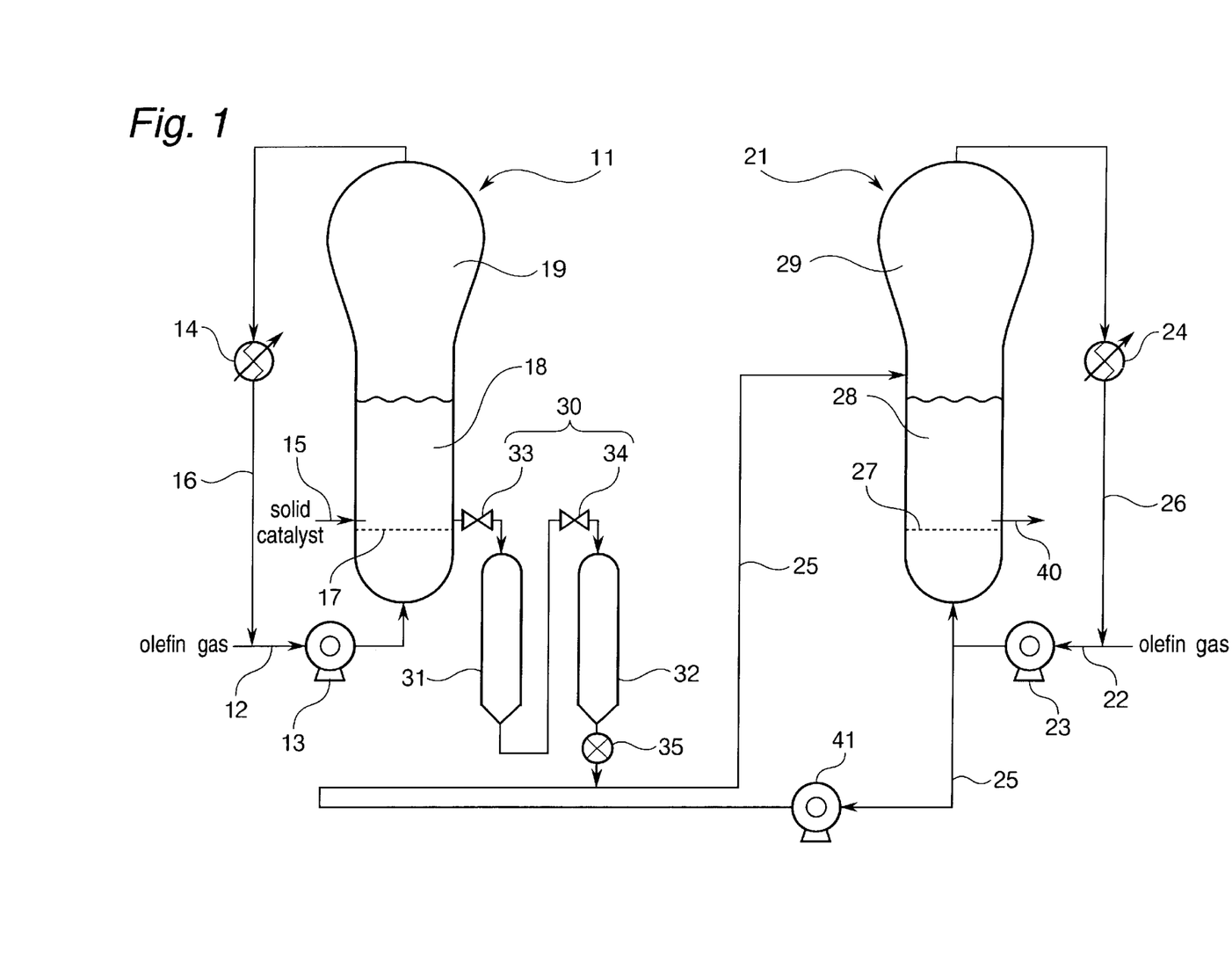
FIG. 1 is a schematic view showing one example of a gas phase polymerization apparatus.

First, one example of the gas phase polymerization apparatus used in the present invention will be illustrated referring to a multi-stage gas phase polymerization apparatus having two gas phase fluidized bed reactors connected in series, as an example.

In a multi-stage gas phase polymerization apparatus shown in FIG. 1 for example, a first fluidized bed reactor 11 and a second fLuidized bed reactor 21 are connected in series.

Namely, a transition metal compound catalyst (solid catalyst) such as a metallocene-based supporting catalyst and the like is fed through a feeding line 15 into a first fluidized bed reactor 11, and a gas (fluidized gas) containing a gaseous olefin (polymerization monomer) and a saturated aliphatic hydrocarbon is fed through a feeding line 12 via a blower 13 into the bottom part of the first fluidized bed reactor 11. This fluid-zed gas fed is blown into a fluidized bed 18 through a dispersing plate 17 made of a porous plate and the like placed near the bottom part of the first fluidized bed reactor 11, and discharged from the upper part of the first fluidized bed reactor 11, passing through the inside of the fluidized bed reactor. By this flow of a gas passing through the inside of the fluidized bed reactor, solid particles (solid catalyst and produced polymer) are kept under a fluidized condition, to form a fluidized bed 18.

The produced polymer particle is continuously or intermittently extracted, and separated into a solid and a gas in solid-gas separating vessels 31 and 32. In this procedure, valves 33 and 34 are appropriately controlled to open and close. Thus, extracted polymer particles are discharged into a transport line 25 by the motion of valve 35, and pass through a transport line 25 and are transported to a second fluidized bed reactor 21.

An unreacted olefin in the form of a gas and a saturated aliphatic hydrocarbon and the like that have passed through the fluidized bed 18 are reduced in flow speed in a speed reduction region 19 provided in the upper portion of the first fluidized bed reactor 11, and are discharged out of the first fluidized bed reactor 11 through a gas outlet provided on the upper part of the first fluidized bed reactor 11.

The unreacted olefin in the form of a gas and the saturated aliphatic hydrocarbon and the like that have been discharged from the first fluidized bed reactor 11 are cooled by a heat exchanger (cooling apparatus) 14 while passing through circulation line 16, then merge with the feeding line 12, and are continuously fed again into the fluidized bed 18 in the first fluidized bed reactor 11 by the blower 13. In the heat exchanger 14, a circulation gas is usually cooled to temperatures near the dew point of the gas. The dew point is the temperature at which a liquid condensate starts to be produced in gas. If a circulation gas is cooled to a temperature of not more than the dew point and fed into the fluidized bed 18, the reaction heat can be removed by vaporization latent heat of the liquid condensate, and the efficiency of heat removal in the fluidized bed 18 can be improved. In circulating a circulation gas into the first fluidized bed reactor 11, a part of the circulation gas may be purged from any position of the circulation line 16.

On the other hand, polymer particles extracted via the solid-gas separation vessels 31 and 32 through the extraction line 30 from the first fluidized bed reactor 11 are transported into a second fluidized bed reactor 21 via a transport line 25. The transport line 25 is separated from a feeding line 22, and other end thereof is connected to the upper part of a the second fluidized bed reactor 21, and the pressure of a gas containing an olefin and a saturated aliphatic hydrocarbon transported from the feeding line 22 is increased by a pressure increasing means such as a centrifugal blower 41 and the like, and at the same time, polymer particles extracted from the first fluidized bed reactor 11 are transported together with this gas, to be introduced into the second fluidized bed reactor 21. Further, a fresh gaseous olefin (polymerization monomer) and a saturated aliphatic hydrocarbon are fed from a feeding line 22 via a blower 23 through the transport line 25 into the second fluidized bed reactor 21, and at the same time, are fed as a fluid zed gas into the bottom part of the second fluidized bed reactor 21. Though no fresh solid catalyst is usually fed into the second fluidized bed reactor 21, a fresh solid catalyst may also be fed via any position of the fluidized bed reactor, for example, via the transport line 25, if necessary.

This fluidized gas fed from the bottom part of the second fluidized bed reactor 21 is blown into a fluidized bed 28 through a dispersing plate 27 made of a porous plate and the like placed near the bottom part of the second fluidized bed reactor 21, and discharged from the upper part of the fluidized bed reactor 21, passing through the inside of the fluidized bed reactor 21. By this flow of a gas passing through the inside of the fluidized bed reactor 21, solid particles (the above-mentioned polymer particles and produced polymer) are kept under a fluidized condition, to form a fluidized bed 28. In this process, a copolymerization reaction is conducted in the fluidized bed 28.

The polymer particles obtained in the second fluidized bed reactor 21 are continuously or intermittently extracted through a line 40.

An unreacted olefin in the form of a gas and a saturated aliphatic hydrocarbon and the like that have passed through the fluidized bed 28 are reduced in flow speed in a speed reduction region 29 provided in the upper portion of the second fluidized bed reactor 21, and are discharged out of the second fluidized bed reactor 21 through a gas outlet provided on the upper part of the second fluidized bed reactor 21.

The unreacted olefin in the form of a gas and the saturated aliphatic hydrocarbon and the like that have been discharged from the second fluidized bed reactor 21 are cooled by a heat exchanger (cooling apparatus) 24 while passing through a circulation line 26, then merge with the feeding line 22, and are fed continuously again into the fluidized bed 28 in the second fluidized bed reactor 21 by the blower 23. In the heat exchanger 24, a circulation gas is usually cooled to temperatures near the dew point of the gas. If a circulation gas is cooled to a temperature of not more than the dew point and fed into the fluidized bed 28, the reaction heat can be removed by vaporization latent heat of the liquid condensate, and the efficiency of heat removal in the fluidized bed 28 can be improved. In circulating a circulation gas into the second fluidized bed reactor 21, some of the circulation gas may be purged from any position of the circulation line 26.

As described above, in the first fluidized bed reactor 11, a fluidized gas flows at such a flow rate that the fluidized bed 18 can be kept in a flowing state, and in the second fluidized bed reactor 21, a fluidized gas flows at such a flow rate that the fluidized bed 28 can be kept in a flowing state.

Specifically, regarding the amount of a fluidized gas introduced via the bottom part of a reactor from feeding lines 12 and 22, when the minimum fluidizing speed of the fluidized bed is represented by $U_{mf}$, a flow rate of from approx. 3 $U_{mf}$ to 50 $U_{mf}$, preferably from approx. 5 $U_{mf}$ to 30 $U_{mf}$ is desirable. The fluidized bed can also be stirred mechanically, and for example, stirring can be effected using stirring machines of various types such as an anchor type stirring machine, screw type stirring machine, ribbon type stirring machine and the like.

Though a multi-stage gas phase polymerization apparatus in which two fluidized bed reactors, that is, the first fluidized bed reactor 11 and the second fluidized bed reactor 21 are connected in series has been illustrated above, even a multi-stage gas phase polymerization apparatus having three or more fluidized bed reactors can be constituted likewise.

In the present invention, the multi-stage gas phase polymerization apparatus as described above is used, at least two olefins selected from the group consisting of ethylene and α-olefins raving 3 to 20 carbon atoms that have been fed into a fluidized bed reactor are copolymerized in the fluidized bed, and copolymerization is conducted in the presence of a copolymer produced in the previous stage, in a reactor of a second or later stage.

In the present invention, the polymer produced in each reactor is not particularly restricted, and it is preferable, as described below, to produce a polyethylene of a higher molecular weight in at least one reactor, and to produce a polyethylene of a lower molecular weight in another reactor, as described below.

Specific examples of the α-olefin having 3 to 20 carbon atoms include propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene and the like. Of them, α-olefins having 3 to 10 carbon atoms, particularly having 5 to 8 carbon atoms are preferably used. These α-olefins having 3 to 20 carbon atoms can be used alone or in combinations of two or more.

Regarding the ratio of at least two olefins fed to a fluidized bed reactor, another olefin is usually fed in an amount of 0.015 to 0.15 mol, preferably from 0.02 to 0.08 mol based on one olefin, though this varies depending on the composition of the polyolefin to be obtained finally. For example, when ethylene and an α-olefin having 3 to 20 carbon atoms are used as the at least two olefins, regarding the ratio of ethylene and an α-olefin having 3 to 20 carbon atoms, the olefin is fed usually in an amount of 0.015 to 0.15 mol, preferably from 0.02 to 0.08 mol based on 1 mol of ethylene, though it varies depending on the linear low density polyethylene composition that is to be finally obtained.

In the present invention, polyenes and the like may be copolymerized, if necessary, together with at least two olefins, and for example, conjugated dienes such as butadiene, isoprene and the like; and non-conjugated dienes such as 1,4-hexadiene, dicyclopentadiene, 5-vinyl-2-norbornene and the like can be copolymerized.

In the present invention, the above-mentioned copolymerization is conducted in coexistence with a saturated aliphatic hydrocarbon, preferably a gaseous saturated aliphatic hydrocarbon having 2 to 10 carbon atoms.

Specific examples of the saturated aliphatic hydrocarbon having 2 to 10 carbon atoms include ethane, propane, n-butane, i-butane, n-pentane, i-pentane, hexane, heptane, octane, nonane, decane, 2,2-dimethylpropane, 2,2-dimethylbutane, 2,3-dimethylbutane, 2,2,3-trimethylbutane, 2-methylpentane, 3-methylpentane, 2,2-dimethylpentane, 3,3-dimethylpentane, 2,3-dimethylpentane, 2,4-dimethylpentane, 2-methylhexane, 3-methylhexane, 4-methylhexane, 2,3-dimethylhexane, cyclopentane, cyclohexane, methylcyclopentane, dimethylcyclopentane and the like. These saturated aliphatic hydrocarbons can be used alone or in combinations of two or more.

The saturated aliphatic hydrocarbon as described above is a non-polymerizable hydrocarbon, and once fed into a fluidized bed reactor, it is not consumed in polymerization, and a saturated aliphatic hydrocarbon contained in a gas discharged from the fluidized bed reactor is circulated through a circulation line into the fluidized bed reactor.

This saturated aliphatic hydrocarbon may be introduced in gaseous form into a fluidized bed, or may be introduced in the condition wherein at least a part of which is in the form of a liquid into a fluidized bed. A saturated aliphatic hydrocarbon introduced from a feeding line preferably exists in gaseous form in a fluidized bed from the standpoint of uniform polymerization, and at least a part of which may exist in the form of mist. These conditions are appropriately set depending on balance between uniformity and heat removal. A saturated aliphatic hydrocarbon may be introduced in the form of mist from a feeding line, and it is also preferable that a saturated aliphatic hydrocarbon is introduced in gaseous form into a feeding line of a fluidized bed reactor.

Further, though a saturated aliphatic hydrocarbon is usually introduced into a fluidized bed reactor through a feeding line together with an olefin as described above, it can also be fed from an arbitrary position of the fluidized bed reactor, and for example, it may be fed directly into a fluidized bed through a feeding line for a catalyst.

The concentration of a saturated aliphatic hydrocarbon in a mixed gas in a fluidized bed is so controlled that it is usually from 0.1 to 30 mol %, preferably from 0.1 to 20 mol %, more preferably from 1.0 to 20 mol %, further preferably 5.0 to 10 mol % in a fluidized bed of a first stage. When an olefin is polymerized while controlling the concentration of a saturated aliphatic hydrocarbon in a mixed gas in a fluidized bed within the above-mentioned range, generation of a lump in the polymerization vessel is suppressed.

In the mixed gas, a polymerization monomer, a saturated aliphatic hydrocarbon, an inert gas such as nitrogen and the like, hydrogen as a molecular weight controlling agent, and the like are contained.

Further, the ratio of the concentration ($C_2$) of a saturated aliphatic hydrocarbon in a reactor of a second stage to the concentration ($C_1$) of a saturated aliphatic hydrocarbon in a reactor of a first stage ($C_2/C_1$) is usually 0.13 or more, preferably from 0.13 to 20, more preferably from 0.15 to 20, further preferably from 0.17 to 20, particularly preferably from 0.2 to 10, most preferably from 0.5 to 2.

Where $C_2/C_1$ is in the above-mentioned range, a polyolefin composition having a narrow composition distribution, particularly narrow molecular weight distribution, for example, an LLDPE composition having a narrow composition distribution, and a narrow molecular weight distribution is obtained. Further, sheeting in a reactor is prevented, and a polyolefin composition such as an LLDPE and the like can be produced stably with high productivity.

As the method of controlling $C_2/C_1$ within the above-mentioned range, there is a method in which the amount of a saturated aliphatic hydrocarbon fed into a reactor of a first stage is appropriately regulated, a method in which conditions (temperature, pressure, time and the like) of a purging operation in a solid-gas separation vessel provided between a reactor of a first stage and a reactor of a second stage are appropriately set, a method in which the amount of a saturated aliphatic hydrocarbon fed into a reactor of a second stage is appropriately regulated, and the like.

Also, by appropriately regulating the amount of components that are fed, other than a saturated aliphatic hydrocarbon, the concentration of the saturated aliphatic hydrocarbon can be indirectly controlled, and resultantly, $C_2/C_1$ can be controlled.

Further, by controlling not the amount fed, but the amount of consumption and the amount of removal of each component in the reaction system, $C_2/C_1$ can be controlled.

The controlling methods as described above may be used alone or in combinations of two or more. Of these controlling methods, the appropriate regulation of the amount of a saturated aliphatic hydrocarbon fed into a reactor of a second stage is particularly preferable from the standpoint of the degree of freedom in setting conditions, since $C_2/C_1$ can be controlled independently from the value of $C_1$.

In the present invention, it is preferable to conduct copolymerization while controlling the concentration of a saturated aliphatic hydrocarbon in a mixed gas in one reactor to be higher than the concentrations of saturated aliphatic hydrocarbons in mixed gases in reactors of the previous stage. Specifically, a saturated aliphatic hydrocarbon is introduced into a fluidized bed reactor in such an amount that the concentration of a saturated aliphatic hydrocarbon in a mixed gas present in a fluidized bed is higher than the concentration in the previous stage, for example, in such an amount that is higher than the concentration in the previous stage by 0.2 to 20 mol %, Preferably by 1 to 5 mol %, in a reactor of a second or later stage.

The concentration of a saturated aliphatic hydrocarbon in a mixed gas is, when two gas phase fluidized bed reactors are used for example, controlled so that the hydrocarbon is contained in a mixed gas in a fluidized bed of a first stage in an amount from 0.8 to 80 mol %, preferably from 1.5 to 60 mol %, and the hydrocarbon is contained in a mixed gas in a fluidized bed of a second stage in an amount from 0.8 to 80 mol %, preferably from 1.5 to 60 mol %. When three or more gas phase fluidized bed reactors are used, the concentrations of saturated aliphatic hydrocarbons in mixed gases in fluidized beds of a first stage and the final stage are respectively the same as the concentrations of saturated aliphatic hydrocarbons in mixed gases in fluidized beds of a first stage and a second stage, and the concentrations of saturated aliphatic hydrocarbons in mixed gases in fluidized beds of a second stage to a stage directly before the final stage are between the concentration in a first stage and the concentration in the final stage.

A suitable range of the concentration of a saturated aliphatic hydrocarbon contained in the above-mentioned mixed gas usually differs depending on the number of carbon atoms, and particularly in a reactor of a first stage, it is desirable that the amount of a saturated aliphatic hydrocarbon having 2 carbon atoms (ethane) is usually from 10 to 20 mol %, preferably from 15 to 20 mol %, the amount of a saturated aliphatic hydrocarbon having 3 carbon atoms (propane) is usually from 5 to 20 mol %, preferably from 8 to 20 mol %, the amount of a saturated aliphatic hydrocarbon having 4 carbon atoms (n-butane, i-butane) is usually from 3 to 20 mol %, preferably from 5 to 15 mol %, the amount of a saturated aliphatic hydrocarbon having 5 carbon atoms (n-pentane, i-pentane) is usually from 2 to 20 mol %, preferably from 3.5 to 20 mol %, the amount of a saturated aliphatic: hydrocarbon having 6 carbon atoms (n-hexane, 2-methylpentane, 3-methylpentane, cyclohexane) is usually from 1.5 to 20 mol %, preferably from 2.5 to 15 mol %, the amount of a saturated aliphatic hydrocarbon having 7 carbon atoms (n-heptane, 2-methylhexane, 3-methylhexane, 4-methylhexane, methylcyclohexane) is usually from 1.0 to 15 mol %, preferably from 2 to 10 mol %, and the amount of a saturated aliphatic hydrocarbon having 8 to 10 carbon atoms is usually from 0.8 to 10 mol %, preferably from 1.5 to 7 mol %.

The range of the suitable concentration of the above mentioned saturated aliphatic hydrocarbons is a suitable concentration range when each saturated aliphatic hydrocarbon is used alone, and when two or more saturated aliphatic hydrocarbons are used in combination, the suitable concentration range of each saturated aliphatic hydrocarbon manifests a value according to the mixing ratio (molar ratio).

In a fluidized bed, the polymerization temperature in copolymerization of at least two olefins conducted by introducing a saturated aliphatic hydrocarbon as described above is not particularly restricted, and in the case, for example, of copolymerization of ethylene with anα-olefin having 3 to 10 carbon atoms, the polymerization temperature is usually from 20 to 130° C., preferably from 50 to 120° C., more preferably from 70 to 110° C. In the present invention, polymerization is preferably conducted at a temperature near the dew point of a mixed gas containing a polymerization monomer, a saturated aliphatic hydrocarbon, an inert gas such as nitrogen and the like, hydrogen as a molecular weight controlling agent, and the like, present in a fluidized bed, and particularly, the polymerization is preferably conducted at a temperature from the dew point of the mixed gas to a temperature 5° C. higher than the dew point. However, polymerization can also be conducted at a temperature above a temperature 5° C. higher than the dew point, or a temperature lower than the dew point.

Further, the polymerization pressure differs depending on the kinds and ratio of olefins to be copolymerized, the ratio of a saturated aliphatic hydrocarbon, fluidized condition of a fluidized bed, and the like, and usually in the range from 0.098 to 9.8 MPa, preferably from 0.19 to 3.9 MPa.

The above-mentioned copolymerization can also be conducted in the presence of a molecular weight controlling agent such as hydrogen and the like, if necessary, and the molecular weight controlling agent such as hydrogen and the like can be fed from an any position of a fluidized bed reactor, for example, from a feeding line.

In the present invention, the molecular weight of a copolymer can be controlled by changing the polymerization conditions such as the polymerization temperature and the like, or can be controlled by regulating the amount of hydrogen (molecular weight controlling agent) used.

It is preferable that the polyolefin produced in each reactor in the present invention, for example, polyethylene has a melt index (measured at 190° C. under a load of 2.16 kg according to ASTM D 1238) from 0.01 to 3000 g/10 min., preferably from 0.2 to 100 g/10 min., and a density (ASTM D 150E) from 0.860 to 0.980 g/cm$^3$, preferably from 0.890 to 0.950 g/cm$^3$. Polyethylenes produced in the above-mentioned reactors may be the same or different mutually.

In the present invention, the ratio of a polyolefin produced in each reactor, for example, polyethylene, is not particularly restricted, and is preferably at least 1% by weight or more based on a finally obtained polyolefin composition, for example, a linear low density polyethylene composition.

In the present invention, it is preferable that at least two gas phase fluidized bed reactors are used, a polyethylene of a higher molecular weight is produced in one reactor and a polyethylene of a lower molecular weight is produced in another reactor, and it is more preferable that a polyethylene of a higher molecular weight having a melt index from 0.01 to 50 g/10 min., preferably from 0.2 to 12 g/10 min. and a density of at least 0.860 g/cm$^3$, preferably from 0.860 to 0.950 g/cm$^3$, more preferably from 0.890 to 0.950 g/cm$^3$ is produced in one reactor and a polyethylene of a lower molecular weight having a melt index from 0.5 to 3000 g/10 min., preferably from 1 to 1000 g/10 min. and a density of at least 0.900 g/cm$^3$, preferably from 0.900 to 0.975 g/cm , more preferably from 0.910 to 0.975 g/cm$^3$ is produced in another reactor. In this procedure, in a reactor of a second or later stage, copolymerization is conducted in the presence of a copolymer produced in the previous stage.

Particularly, in the present invention, it is preferable that two gas phase fluidized bed reactors are used, a polyethylene of a higher molecular weight is produced in a first stage and a polyethylene of a lower molecular weight is produced in a second stage and it is more preferable that a polyethylene of a higher molecular weight having a melt index from 0.01 to 50 g/10 min., preferably from 0.2 to 12 g/10 min. and a density of at least 0.860 g/cm$^3$, preferably from 0.860 to 0.950 g/cm$^3$, more preferably from 0.890 to 0.950 g/cm$^3$ is produced in a reactor of a first stage and a polyethylene of a lower molecular weight having a melt index from 0.5 to 3000 g/10 min., preferably from 1 to 1000 g/10 min. and a density of at least 0.900 g/cm$^3$, preferably from0.900 to 0.975 g/cm$^3$, more preferably from 0.910 to 0.975 g/cm$^3$ is produced in a reactor of a second stage. In this procedure, in a reactor of a second or later stage, copolymerization is conducted in the presence of a copolymer produced in the previous stage.

Furthermore, in the present invention, it is preferable that two gas phase fluidized bed reactors are used, a polyethylene of a higher molecular weight is produced in a first stage and a polyethylene of a lower molecular weight is produced in a second stage, and there is also an embodiment in which a polyethylene of a higher molecular weight having a flow index from 0.01 to 50 g/10 min., preferably from 0.2 to 12 g/10 min. and a density of at least 0.860 g/cm$^3$ preferably from 0.860 to 0.950 g/cm$^3$, more preferably from 0.890 to 0.950 g/cm$^3$ is produced in a reactor of a first stage and a polyethylene of a lower molecular weight having a melt index from 0.5 to 3000 g/10 min., preferably from 1 to 1000 g/10 min. and a density of at least 0.900 g/cm$^3$, preferably from 0.900 to 0.975 g/cm$^3$, more preferably from 0.910 to 0.975 g/cm$^3$ is produced in a reactor of a second stage.

The above-mentioned polyethylene of a higher molecular weight has a molecular weight of usually from approx. 135000 to approx. 445000 and a melt flow ratio of usually from approx. 12 to approx. 70, preferably from approx. 14 to approx. 45. The above-mentioned polyethylene of a lower molecular weight has a molecular weight of usually from approx. 15800 to approx. 35000 and a melt flow ratio of from approx. 12 to approx. 70, preferably from approx. 14 to approx. 45.

The melt index is measured at 190° C. under a load of 2.16 kg according to ASTM D 1238, condition E, and reported in terms of g/10 min. The flow index is measured at 190° C. under a load of 10-fold of the load used for measuring melt index according to ASTM D 1238, condition F, and reported in terms of g/10 min. The melt flow ratio is a ratio of flow index to melt index.

When a linear low density polyethylene composition is composed of a polyethylene of a higher molecular weight and a polyethylene of lower molecular weight, the weight ratio of the polyethylene of a higher molecular weight to the polyethylene of a lower molecular weight is usually from 30:70 to 80:20, preferably from 40:60 to 60:40.

It is preferable that the linear low density polyethylene composition has a melt index from 0.02 to 3.5 g/10 min., preferably from 0.04 to 2.0 g/10 min. and a density from 0.910 to 0.960 g/cm$^3$, preferably from 0.920 to 0.950 g/cm$^3$. Further, the linear low density polyethylene composition has a molecular weight in the range usually from approx. 90000 to approx. 450000, and a melt flow ratio in the range usually from approx. 30 to approx. 150, preferably from approx. 35 to approx. 145.

This Linear low density polyethylene composition contains, for example, repeating units derived from ethylene in an amount of from 8.0 to 98.0 mol %, preferably from 90.0 to 97.0 mol %, and repeating units derived from an olefin having 3 to 10 carbon atoms in an amount of from 13.0 to 2.0 mol %, preferably from 10.0 to 3.0 mol %.

Further, the linear low density polyethylene composition may contain repeating units derived from the polyenes as described above and the like in an amount of 10% by weight or less, preferably 5% by weight or less, particularly preferably 3% by weight or less with the proviso that it is not harmful to the object of the present invention.

In producing such a linear low density polyethylene composition, in a fluidized bed reactor for producing a polyethylene of higher molecular weight, an olefin is fed in an amount usually from 0.01 to 0.4 mol, preferably from 0.02 to 0.35 mol per 1 mol of ethylene, and in a fluidized bed reactor for producing a polyethylene of lower molecular weight, an olefin is fed in an amount usually from 0.005 to 0.6 mol, preferably from 0.01 to 0.42 mol per 1 mol of ethylene.

Into a fluidized bed reactor, hydrogen can be fed if necessary, and in this case, in a fluidized bed reactor for producing a polyethylene of higher molecular weight, hydrogen is fed in an amount usually from 0.001 to 0.3 mol, preferably from 0.017 to 0.18 mol per 1 mol of ethylene, and in a fluidized bed reactor for producing a polyethylene of lower molecular weight, hydrogen is fed in an amount usually from 0.01 to 3 mol, preferably from 0.5 to 2.2 mol per 1 mol of ethylene.

The polymerization temperature is as described above, and the polymerization pressure differs depending on the kinds and ratio of olefins to be copolymerized, the ratio of a saturated aliphatic hydrocarbon, the fluidized condition of a fluidized bed, and the like, and specifically, the polymerization pressure in a reactor of a first stage is usually from 0.098 to 9.8 MPa, preferably from 0.19 to 3.9 MPa, and the polymerization pressure in a reactor of a second stage is usually from 0.098 to 9.8 MPa, preferably from 0.19 to 3.9 MPa.

In the present invention, a polyolefin composition, for example, a linear low density polyethylene composition can be obtained in the form of a granular particle by the gas phase polymerization as described above. It is desirable that the average particle diameter of this particle is from approx. 250 to 3000 µm, preferably from approx. 400 to 1500 µm.

Next, the method of producing a polyolefin composition according to another embodiment of the present invention will be illustrated.

According to the present invention, in multi-stage gas phase polymerization of an olefin wherein at least two gas phase fluidized bed reactors are used, and at least one olefin selected from ethylene and α-olefins having 3 to 20 carbon atoms is polymerized or copolymerized to produce a polyolefin composition, a saturated aliphatic hydrocarbon is allowed to exist in a transport line for transporting a polymer particle (also including powdery one) extracted from a fluidized bed reactor of the previous stage to a fluidized bed reactor of the subsequent stage.

In the present invention, a multi-stage gas phase polymerization apparatus shown in FIG. 1 as described above is used, for example, and a polyolefin composition is produced in the same manner as described above. In the present invention, a saturated aliphatic hydrocarbon is introduced into a fluidized bed 18 and/or a fluidized bed 28, if necessary. It is preferable that the copolymerization reaction is conducted at a temperature above the dew point of a mixed gas containing a polymerization monomer, an inert gas such as nitrogen and the like, hydrogen as a molecular weight controlling agent, a saturated aliphatic hydrocarbon introduced if necessary, and the like, present in the fluidized bed 18 and fluidized bed 28, from the standpoint of uniform polymerization. However, polymerization can also be conducted at temperatures not more than the dew point. In any case, it is preferable that a circulation gas is cooled to a temperature near the dew point of the circulation gas usually in a heat exchanger 14.

In the present invention, in producing a polyolefin composition by polymerizing or copolymerizing an olefin using the multi-stage gas phase polymerization apparatus as described above, a saturated aliphatic hydrocarbon, preferably a saturated aliphatic hydrocarbon having 2 to 10 carbon atoms is allowed to exist in a transport line for transporting a polymer particle extracted from a fluidized bed reactor of the previous stage to a fluidized bed reactor of the subsequent stage. This saturated aliphatic hydrocarbon is preferably in the form of a gas.

This saturated aliphatic hydrocarbon may be a saturated aliphatic hydrocarbon introduced into a fluidized bed reactor and introduced into a transport line together with a polymer particle, or may be one freshly introduced into a transport line from the outside of a reactor.

More specifically, in a multi-stage gas phase polymerization apparatus shown in FIG. 1 for example, a saturated aliphatic hydrocarbon introduced into the fluidized bed 18 may be introduced into the transport line 25 together with a polymer particle extracted from an extraction line 30, or may be introduced into the transport line 25 via the blower 23 from the feeding line 22. The saturated aliphatic hydrocarbon may also be introduced between a centrifugal blower 41 and the blower 23, or may be introduced between a part at which a polymer particle is discharged into the transport line 25 and the centrifugal blower 41. Further, the saturated aliphatic hydrocarbon can be introduced into the transport line 25 by feeding gases separated in the solid-gas separation vessels 31 and 32 to the transport line 25.

As the saturated aliphatic hydrocarbon having 2 to 10 carbon atoms, the same compounds as described above are listed. These saturated aliphatic hydrocarbons can be used alone or in combinations of two or more.

It is desirable that the concentration of a saturated aliphatic hydrocarbon in a transport line is usually from 0.1 to 30 mol %, preferably from 0.1 to 20 mol %, more preferably from 1 to 10 mol %. In a transport line, a polymerization monomer, a saturated aliphatic hydrocarbon, an inert gas such as nitrogen and the like, hydrogen as a molecular weight controlling agent, and the like are contained, and the concentration of a saturated aliphatic hydrocarbon is calculated based on the mixed gas composed of them.

When the concentration of a saturated aliphatic hydrocarbon in a transport line is in the above-described range, a polymer particle in the transport line manifests excellent flowability, and the line is not obstructed.

In the present invention, the multi-stage gas phase polymerization apparatus as described above is used, and in a reactor of a second or later stage, at least one olefin selected from ethylene and α-olefins having 3 to 20 carbon atoms is polymerized or copolymerized in the presence of a polymer produced in the previous stage. In this procedure, it is preferable that different polymers are respectively produced in reactors.

As the α-olefins having 3 to 20 carbon atoms, the same compounds as described above are specifically listed.

In the present invention, though the polymer produced in each reactor is not particularly restricted, it is preferable that ethylene and an α-olefin having 3 to 10 carbon atoms are copolymerized to produce a polyethylene in at least one reactor, and ethylene and an α-olefin having 3 to 10 carbon atoms are copolymerized to produce a polyethylene having molecular weight or composition different from those of the above-mentioned polyethylene in another reactor, and particularly, is it preferable that the above-mentioned polyethylene of a higher molecular weight is produced in at least one reactor, and the above-mentioned polyethylene of a lower molecular weight is produced in another reactor, to give a linear low density polyethylene composition.

Further, in the present invention, the polyenes as described above and the like may be copolymerized, if necessary, together with at least one kind of olefin.

When a copolymer is produced in a fluidized bed reactor, the ratio of monomers to comonomers fed into the fluidized bed reactor is not particularly restricted.

In the present invention, polymerization of an olefin in each reactor is conducted in coexistence with, if necessary, a saturated aliphatic hydrocarbon, preferably a gaseous saturated aliphatic hydrocarbon having 2 to 10 carbon atoms. As the saturated aliphatic hydrocarbon, the same compounds as described above are specifically listed. These saturated aliphatic hydrocarbons can be used alone or in combinations of two or more.

This saturated aliphatic hydrocarbon may be introduced in the form of a gas into a fluidized bed, or may be introduced in the condition wherein at least a part of which is in the form of liquid into a fluidized bed.

Further, though a saturated aliphatic hydrocarbon is usually introduced into a fluidized bed reactor through a feeding line together with an olefin, it can also be fed from an arbitrary position of the fluidized bed reactor, and for example, it may be fed directly into a fluidized bed through a feeding line of a catalyst.

The concentration of a saturated aliphatic hydrocarbon is so controlled that the hydrocarbon is contained in an amount from 0.5 to 80 mol %, preferably from 1 to 60 mol % in a mixed gas in a fluidized bed.

A suitable range of the concentration of a saturated aliphatic hydrocarbon contained in the above-mentioned mixed gas usually differs depending on the number of carbon atoms, and it is desirable that the concentration of a saturated aliphatic hydrocarbon having 2 carbon atoms (ethane) is usually from 10 to 80 mol %, preferably from 15 to 60 mol %, the concentration of a saturated aliphatic hydrocarbon having 3 carbon atoms (propane) is usually from 5 to 60 mol %, preferably from 8 to 40 mol %, the concentration of a saturated aliphatic hydrocarbon having 4 carbon atoms (n-butane, i-butane) is usually from 3 to 40 mol %, preferably from 5 to 15 mol %, the concentration of a saturated aliphatic hydrocarbon having 5 carbon atoms (n-pentane, i-pentane) is usually from 2 to 30 mol %, preferably from 3.5 to 20 mol %, the concentration of a saturated aliphatic hydrocarbon having 6 carbon atoms (n-hexane, 2-methylpentane, 3-methylpentane, cyclohexane) is usually from 1.5 to 20 mol %, preferably from 2.5 to 15 mol %, the concentration of a saturated aliphatic hydrocarbon having 7 carbon atoms (n-heptane, 2-methylhexane, 3-methylhexane, 4-methylhexane, methylcyclohexane) is usually from 1.0 to 15 mol %, preferably from 2 to 10 mol %, and the concentration of a saturated aliphatic hydrocarbon having 8 to 10 carbon atoms is usually from 0.8 to 10 mol %, preferably from 1.5 to 7 mol %.

The range of the suitable concentration of the above mentioned saturated aliphatic hydrocarbons is a suitable concentration range when each saturated aliphatic hydrocarbon is used alone, and when two or more saturated aliphatic hydrocarbons are used in combination, the suitable concentration range of each saturated aliphatic hydrocarbon manifests a value according to the mixing ratio (molar ratio).

When polymerization is conducted while controlling the concentration of a saturated aliphatic hydrocarbon in a transport line within a specific range and introducing a saturated aliphatic hydrocarbon into a fluidized bed as described above, the transport line is not obstructed, and further, a polymer bulk, sheet and the like are not easily formed in the fluidized bed, and a polymer having a narrow molecular weight distribution can be obtained with high polymerization activity. Further, when a saturated aliphatic hydrocarbon is introduced in he form of liquid into a fluidized bed, the reaction heat can be removed by vaporization latent heat of the saturated aliphatic hydrocarbon, and the efficiency of heat removal in the fluidized bed can be improved, generation of a polymer bulk, sheet and the like in the fluidized bed becomes more difficult. When polymerization is conducted while controlling the concentration of a saturated aliphatic hydrocarbon in a transport line within a specific range and introducing a saturated aliphatic hydrocarbon into a fluidized bed as described above, gas phase polymerization can be conducted stably for a long period of time.

Though polymerization conditions in a fluidized bed differ depending on also the kinds and ratio of olefin to be copolymerized, he ratio of a saturated aliphatic hydrocarbon introduced if necessary, the flow condition of a fluidized bed, and the like, the polymerization temperature is usually from 20 to 130° C., preferably from 50 to 120° C., more preferably from 60 to 100° C. under a conditions of the polymerization pressure of from 0.1 to 10 MPa, preferably from 0.2 to 4 MPa.

When the above-mentioned saturated aliphatic hydrocarbon is introduced in the form of a gas into a fluidized bed and olefins are copolymerized, the copolymerization can be conducted under temperatures near the dew point of a mixed gas containing a polymerization monomer, a saturated aliphatic hydrocarbon, an inert gas such as nitrogen and the like, hydrogen as a molecular weight controlling agent, and the like, that exist in the fluidized bed, at a temperature above the dew point, at a temperature below the dew point, and the like, within the above-mentioned range of polymerization temperature.

The above-mentioned copolymerization can be conducted in the presence, if necessary, of a molecular weight controlling agent such as hydrogen and the like. The molecular weight controlling agent such as hydrogen and the like can be fed from any position of a fluidized bed reactor, for example, from a feeding line.

In the present invention, the molecular weight can be controlled by changing the polymerization conditions such as the polymerization temperature and the like, or can be controlled by regulating the amount of hydrogen (molecular weight controlling agent) used.

It is preferable that the polyolefin produced in each reactor in the present invention has a melt index (measured at 190° C. under a load of 2.16 kg according to ASTM D 1238) from 0.01 to 3000 g/10 min., preferably from 0.2 to 100 g/10 min., and a density (ASTM D 150E) from 0.860 to 0.980 g/cm$^3$, preferably from 0.890 to 0.950 g/cm$^3$. Polyolefin produced in the above-mentioned reactors may be the same or different.

In the present invention, the ratio of a polyolefin produced in each reactor is not particularly restricted, and is preferably at least 1% by weight or more based on a finally obtained polyolefin composition.

Further, the polyolefin composition may contain repeating units derived from the polyenes as described above and the like in an amount of 10% by weight or less, preferably 5% by weight or less, particularly preferably 3% by weight or less with the proviso that it is not harmful to the object of the present invention.

It is desirable that the polyolefin composition has a melt index from 0.02 to 50 g/10 min., preferably from 0.04 to 20 g/10 min. This composition has a molecular weight in the range usually from approx. 50000 to approx. 450000. The polyolefin composition has a density of at least 0.890 g/cm³, preferably from 0.900 to 0.960 g/cm³, more preferably from 0.905 to 0.940 g/cm³.

Though the polymerization conditions in a fluidized bed differs depending also on the kinds and ratio of olefins to be copolymerized, fluidized condition of the fluidized bed, and the like, and it is desirable that, when a polyethylene of a higher molecular weight is produced, the polymerization pressure is usually from 0.1 to 10 MPa, preferably from 0.2 to 4 MPa, and the polymerization temperature is usually from 20 to 130° C., Preferably from 50 to 120° C., more preferably from 60 to 100° C., and when a polyethylene of a lower molecular weight is produced, the polymerization pressure is usually from 0.1 to 10 MPa, preferably from 0.2 to 4 MPa, and the polymerization temperature is usually from 20 to 130° C., preferably from 50 to 120° C., more preferably from 60 to 100° C.

The above-mentioned polymerization can be conducted in coexistence with a saturated aliphatic hydrocarbon in the form of a gas having 2 to 10 carbon atoms, if necessary, in the same manner as in the above-mentioned polymerization of an olefin.

When the above-mentioned saturated aliphatic hydrocarbon is introduced into a fluidized bed and ethylene and an olefin having 3 to 10 carbon atoms are copolymerized, the copolymerization can be conducted at a temperature near the dew point of a mixed gas containing a polymerization monomer, a saturated aliphatic hydrocarbon, an inert gas such as nitrogen and the like, hydrogen as a molecular weight controlling agent, and the like, that exist in the fluidized bed, at a temperature above the dew point, at a temperature below the dew point, and the like, within the above-mentioned range of polymerization temperature.

When polymerization is conducted while controlling the concentration of a saturated aliphatic hydrocarbon in a transport line within a specific range and introducing a saturated aliphatic hydrocarbon into a fluidized bed as described above, the transport line is not obstructed, and further, a polymer bulk, sheet and the like are not easily formed in the fluidized bed, and LLDPE having a narrow molecular weight distribution can be obtained with high polymerization activity. Further, when a saturated aliphatic hydrocarbon is introduced in the form of liquid into a fluidized bed, the reaction heat can be removed by vaporization latent heat of the saturated aliphatic hydrocarbon, and the efficiency of heat removal in the fluidized bed can be improved, and generation of a polymer bulk, sheet and the like in the fluidized bed becomes more difficult.

The above-mentioned copolymerization can be conducted in the presence, if necessary, of a molecular weight controlling agent such as hydrogen and the like. The molecular weight controlling agent such as hydrogen and the like can be fed from any position of a fluidized bed reactor, for example, from a feeding line.

In the present invention, the molecular weight can be controlled by changing the polymerization conditions such as the polymerization temperature and the like, or can be controlled by regulating the amount of hydrogen (molecular weight controlling agent) used.

The weight ratio of a polyethylene of a higher molecular weight to a polyethylene of a lower molecular weight produced as described above is from 20:80 to 80:20, preferably from 40:60 to 60:40.

It is preferable that a linear low density polyethylene composition contains repeating units derived from an olefin having 3 to 10 carbon atoms in an amount of 15% by weight or less, preferably from 1 to 10% by weight.

Further, the linear low density polyethylene composition may contain repeating units derived from the polyenes as described above in an amount of 10% by weight or less, preferably 5% by weight or less, particularly preferably 3% by weight or less, with the proviso that it is not harmful to the object of the present invention.

It is desirable that the linear low density polyethylene composition has a melt index from 0.02 to 50 g/10 min., preferably from 0.04 to 20 g/10 min. This composition has a molecular weight in the range usually from approx. 50000 to approx. 450000. This linear low density polyethylene composition has a density of at least 0.890 g/cm³, preferably from 0.900 to 0.960 g/cm³, more preferably from 0.905 to 0.940 g/cm³. The linear low density polyethylene composition has a melt flow rate of from approx. 30 to approx. 150, preferably from approx. 35 to approx. 145.

In the present invention, a polyolefin composition such as a linear low density polyethylene composition and the like can be obtained in the form of a particle by the above-mentioned gas phase polymerization. It is desirable that this particle has an average particle diameter from approx. 250 to 3000 μm, preferably from approx. 400 to 1500 μm.

Transition Metal Compound Catalyst

In the present invention, the copolymerization as described above is conducted in the presence of a transition metal compound catalyst such as a Ziegler type titanium catalyst, Phillip type chromium oxide catalyst, metallocene-based catalyst and the like, preferably in the presence of a metallocene-based supporting catalyst. The metallocene-based supporting catalyst preferably used in the present invention comprises, specifically, for example, (A) a metallocene compound of a transition metal selected from the 4 group of the periodic table, and (B) at least one compound selected from (B-1) organoaluminum-oxy compounds, (B-2) organoaluminum compounds and (B-3) compounds which react with the metallocene compound (A) to form an ion pair. (Metallocene compound (A) of transition metal selected from 4 group of periodic table)

The metallocene compound (A) of a transition metal selected from the 4 group of the periodic table is, specifically, represented by the following formula (i).

$$ML_x \qquad (i)$$

Wherein, M represents a transition metal atom selected from Zr, Ti and Hf.

Ls are a ligand coordinated to a transition metal atom, and at least one L is a ligand having a cyclopentadienyl skeleton, and Ls other than the ligand having a cyclopentadienyl skeleton represent a hydrogen atom, halogen atom, a hydrocarbon group having 1 to 12 carbon atoms, an alkoxy group, an aryloxy group, a trialkylsilyl group or a SO₃R group (wherein, R is a hydrocarbon group having 1 to 8 carbon atoms optionally having a substituent such as a halogen and the like).

x is a number satisfying the atomic value of a transition metal atom.

As the ligand having a cyclopentadienyl skeleton, for example, alkyl-substituted cyclopentadienyl groups such as a cyclopentadlenyl group, methylcyclopentadienyl group, dimethylcyclopentadienyl group, trimethylcyclopentadienyl group, tetramethylcyclopentadienyl group, pentamethylcyclopentadienyl group, ethylcyclopentadienyl group, methylehylcyclopentadienyl group, propylcyclopentadienyl group, methylpropylcyclopentadienyl group, butylcyclopentadienyl group, methylbutylcyclopentadienyl group, hexylcyclopentadienyl group and the like, or an indenyl group, 4,5,6,7-tetrahydroindenyl group, fluorenyl group and the like are exemplified. These groups may also be substituted by a halogen atom, trialkylsilyl group and the like.

Among them, alkyl-substituted cyclopentadienyl groups are particularly preferable.

As the ligand other than the ligand having a cyclopentadienyl skeleton, there are specifically listed, as halogens, fluorine, chlorine, bromine, iodine and the like, as hydrocarbon groups having 1 to 12 carbon atoms, alkyl groups such as a methyl group, ethyl group, propyl group, isopropyl group, butyl group and the like; cycloalkyl groups such as a cyclopentyl group, cyclohexyl group and the like; aryl groups such as a phenyl group, tolyl group and the like; aralkyl groups such as a benzyl group, neophyl group and the like; etc., as alkoxy groups, a methoxy group, ethoxy group, butoxy group and the like, as aryloxy groups, a phenoxy group and the like, as $SO_3R$ groups, a p-toluenesulfonato group, methanesulfonato group, trifluoromethanesulfonate group and the like.

When a compound of the above-mentioned general formula (i) contains two or more groups having a cyclopentadienyl skeleton, the two groups having a cyclopentadienyl skeleton may be mutually connected via an alkylene group such as ethylene, propylene or the like; a substituted alkylene group such as isopropylidene, diphenylmethylene or the like; a substituted silylene group such as silylene, dimethylsilylene, diphenylsilyleie, methylphenylsilylene or the like, etc.

Such a metallocene compound containing a ligand having a cyclopentadienyl skeleton is, when the atomic value of a transition metal atom is 4 for example, represented more specifically by the following formula (ii).

$$R^2{}_k R^3{}_l R^4{}_m R^5{}_n M \qquad \text{(ii)}$$

In the formula, M represents the above-mentioned transition metal, $R^2$ represents a group (ligand) having a cyclopentadienyl skeleton, $R^3$, $R^4$ and $R^5$ represent a group having a cyclopentadienyl skeleton or other groups as described above, k represents an integer of 1 or more, and k+l+m+n=4.

In the present invention, metallocene compounds in which at least two of $R^2$, $R^3$, $R^4$ and $R^5$, for example, $R^2$ and $R^3$ represent a group (ligand) having a cyclopentadienyl skeleton, in the above-mentioned formula: $R^2{}_k R^3{}_l R^4{}_m R^5{}_n M$, are preferably used. These groups having a cyclopentadienyl skeleton may also be connected via an alkylene group, substituted alkylene group, silylene group or substituted silylene group, or the like.

Among the above-mentioned metallocene compounds, specific examples of compounds in which M is zirconium include bis(cyclopentadinyl)zirconium dichloride, bis(cyclopentadinyl)zirconium dibromide, bis(cyclopentadinyl)methylzirconium monochloride, bis(cyclopentadinyl)ethylzirconium monochloride, bis(cyclopentadienyl)cyclohexylzirconium monochloride, bis(cyclopentadienyl)phenylzirconium monochloride, bis(cyclopentadienyl)benzylzirconium monochloride, bis(cyclopentadienyl)zirconium monochloride monohydride, bis(cyclopentadienyl)methylzirconium monohydride, bis(cyclopentadienyl)dimethylzirconium, bis(cyclopentadienyl)diphenylzirconium bis(cyclopentadienyl) dibenzylzirconium, bis(cyclopentadienyl)zirconium methoxy chloride, bis(cyclopentadienyl)zirconium ethoxy chloride, bis(cyclopentadienyl)zirconiumbis(methanesulfonato), bis(cyclopentadienyl)zirconiumbis(p-toluenesulfonato), bis(cyclopentadienyl)zirconiumbis(trifluoromethanesulfonato), bis(methylcyclopentadienyl)zirconium dichloride, bis(dimethylcyclopentadienyl)zirconium dichloride, bis(dimethylcyclopentadienyl)zirconium ethoxy chloride, bis(dimethylcyclopentadienyl)zirconiumbis(trifluoromethanesulfonato), bis(ethylcyclopentadienyl)zirconium dichloride, bis(methylethylcyclopentadienyl)zirconium dichoride, bis(propylcyclopentadienyl)zirconium dichloride, bis(methylpropylcyclopentadienyl)zirconium dichloride, bis(butylcyclopentadienyl)zirconium dichloride, bis(methylbutylcyclopentadienyl)zirconium dichloride, bis(methylbutylcyclopentadienyl)zirconiumbis(methanesulfonato), bis(trimethylcyclopentadienyl)zirconium dichloride, bis(tetramethylcyclopentadienyl)zirconium dichloride, bis(pentamethylcyclopentadienyl)zirconium dichloride, bis(hexylcyclopentadienyl)zirconium dichloride, bis(trimethylsilylcyclopentadienyl)zirconium dichloride, bis(indenyl)zirconium dichloride, bis(indenyl)zirconium dibromide, bis(indenyl)zirconiumbis(p-toluenesulfonato), bis(4,5,6,7-tetrahydroindenyl)zirconium dichloride, bis(fluorenyl)zirconium dichloride, ethylenebis(indenyl)zirconium dichloride, ethylenebis(indenyl)zirconium dibromide, ethylenebis(indenyl)dimethylzirconium, ethylenebis(indenyl)diphenylzirconium, ethylenebis(indenyl)methylzirconium monochloride, ethylenebis(indenyl)zirconiumbis(methanesulfonato), ethylenebis(indenyl)zirconiumbis(p-toluenesulfonato), ethylenebis(indenyl)zirconiumbis(trifluoromethansulfonato), ethylenebis(4,5,6,7-tetrahydroindenyl) zirconium dichloride, isopropylidene(cyclopentadienyl-fluorenyl)zirconium dichloride, isopropylidene(cyclopentadienyl-methylcyclopentadienyl) zirconium dichloride, dimethylsilylenebis(cyclopentadienyl)zirconium dichloride, dimethylsilylenebis(methylcyclopentadienyl)zirconium dichloride, dimethylsilylenebis(dimethylcyclopentadienyl)zirconium dichloride, dimethylsilylenebis(trimethylcyclopentadienyl)zirconium dichloride, dimethylsilylenebis(indenyl)zirconium dichloride, dimethylsilylenebis(2-methylindenyl)zirconium dichloride, dimethylsilylenebis(2-methyl,4-isopropylindenyl)zirconium dichloride, dimethylsilylenebis(2,4,7-trimethylindenyl)zirconium dichloride, dimethylsilylenebis(indenyl)zirconiumbis(trifluoromethanesulfonato), dimethylsilylenebis(4,5,6,7-tetrahydroindenyl)zirconium dichloride, dimethylsilylene(cyclopentadienyl-fluorenyl)zirconium dichloride, diphenylsilylenebis(indenyl)zirconium dichloride, diphenylsilylenebis(2-methyl,4-isopropylindenyl)zirconium dichloride, diphenylsilylenebis(2,4,7-trimethylindenyl)zirconium dichloride, methylphenylsilylenebis(indenyl)zirconium dichloride and the like.

In the above-mentioned examples, di-substituted isomer of a cyclopentadienyl ring include 1,2- and 1,3-substituted isomers, and tri-substituted bodies include 1,2,3- and 1,2,4- substituted bodies. The alkyl group such as propyl, butyl and the like include n-, i-, sec-, tert-isomers and the like.

Compounds wherein zirconium in the above-mentioned zirconium compounds is substituted with titanium or hafnium are also used as the metallocene compound.

In the present invention, as the metallocene compound (A), zirconocene compounds having a ligand containing at least two cyclopentadienyl skeletons are preferably used, and zirconocene compounds having a ligand containing two cyclopentadienyl skeletons are particularly preferably used.

These metallocene compounds can be used alone or in combinations of two or more.

(Organoaluminum-oxy Compound (B-1))

The organoaluminum-oxy compound (B-1) may be conventionally known aluminoxane soluble in benzene, or may be an organoaluminum-oxy compound insoluble in benzene as disclosed in JP-A No. 2-276807.

The aluminoxane as described above can be produced, for example, according to the following method.

(1) An organoaluminum compound such as trialkylaluminum and the like is added to hydrocarbon suspension containing a compound having adsorbed water, or salts having crystal water, for example, a magnesium chloride hydrate, copper sulfatehydrate, aluminum sulfatehydrate, nickel sulfatehydrate, cerium (III) chloride hydrate and the like suspended, and they are reacted.

As the hydrocarbon herein used, hydrocarbon solvents such as aromatic hydrocarbons such as benzene, toluene, xylene, cumene, cymene and the like; aliphatic hydrocarbons such as pentane, hexane, heptane, octane, decane, dodecane, hexadecane, octadecane and the like; alicyclic hydrocarbons such cyclopentane, cyclohexane, cyclooctane, methylcyclopentane and the like; petroleum fractions such as gasoline, kerosene, light oil and the like or halides (for example, chloride, bromide and the like), the above-mentioned aromatic hydrocarbons, aliphatichydrocarbons and alicyclic hydrocarbons, and the like, can be used. Further, ethers such as ethyl ether, tetrahydrofuran and the like can also be used. Among them, particularly, aromatic hydrocarbons are preferably used.

(2) Water, ice or water vapor is allowed to act directly on an organoaluminum compound such as trialkylaluminum and the like in a medium such as benzene, toluene, ethyl ether, tetrahydrofuran and the like.

(3) An organic tin oxide such as dimethyltin oxide, dibutyltin oxide and the like is allowed to react with an organoaluminum compound such as trialkylaluminum and the like in a medium such as decane, benzene, toluene and the like.

This aluminoxane may contain a small amount of organic metal component. Further, a solvent or an unreacted organoaluminum compound may also be removed by distilling from the recovered solution of aluminoxane, before re-dissolution into a solvent.

As the organoaluminum compound used in producing aluminoxane, those described below as the organoaluminum compound (B-2) are specifically listed, these can also be combined and used.

Among them, trialkylaluminum and tricycloalkylaluminum are particularly preferable.

In the organoaluminum-oxy compound insoluble in benzene used in the present invention, the amount of aluminum components dissolved in benzene at 60° C. is 10% or less, preferably 5% or less, particularly preferably 2% or less in terms of an aluminum atom, and the components are insoluble or poor soluble in benzene.

The solubility of such an organoaluminum-oxy compound in benzene is obtained as follows. The organoaluminum-oxy compound in terms of aluminum of 100 mg atoms was suspended in 100 ml of benzene, then, mixed for 6 hours at 60° C. while stirring, then, filtrated with heating at 60° C. using a filter made of G-5 glass equipped with a jacket, and a solid portion separated on the filter was washed four times using 50 ml of benzene at 60° C., then, the amount of Al atoms existing in the whole filtrate (x millimole) is measured, in order to know the solubility (x%).

These organoaluminum-oxy compounds (B-1) can be used alone or in combinations of two or more.

(Organoaluminum Compound (B-2))

The organoaluminum compound (B-2) is represented, for example, by the following general formula (iii).

$$R^1_n AlX_{3-n} \tag{iii}$$

(wherein, $R^1$ represents a hydrocarbon group having 1 to 12 carbon atoms, X represents a halogen atom or a hydrogen atom, and n is 1 to 3.) In the above-mentioned general formula (iii), $R^1$ represents a hydrocarbon group having 1 to 12 carbon atoms, for example, an alkyl group, cycloalkyl group or aryl group, specifically, a methyl group, ethyl group, n-propyl group, isopropyl group, isobutyl group, pentyl group, hexyl group, octyl group, cyclopentyl group, cyclohexyl group, phenyl group, tolyl group and the like.

As such an organoaluminum compound (B-2), there are specifically listed;

trialkylaluminums such as trimethylaluminum, triethylaluminum, triisopropylaluminum, triisobutylaluminum, trioctylaluminum, tri 2-ethylhexylaluminum and the like;

alkenylaluminums such as isoprenylaluminum and the like, dialkylaluminum halides such as dimethylaluminum chloride, diethylaluminum chloride, diisopropylaluminum chloride, diisobutylaluminum chloride, dimethylaluminum bromide and the like;

alkylaluminum sesquihalides such as methylaluminum sesquichloride, ethylaluminum sesquichloride, isopropylaluminum sesquichloride, butylaluminum sesquichloride, ethylaluminum sesquibromide and the like;

alkylaluminum dihalides such as methylaluminum dichloride, ethylaluminum dichloride, isopropylaluminum dichloride, ethylaluminum dibromide and the like;

alkylaluminum hydrides such as diethylaluminum hydride, diisobutylaluminum hydride and the like, etc.

As the organoaluminum compound (B-2), compounds of the following general formula (iv) can also be used.

$$R^1_n AlY_{3-n} \tag{iv}$$

($R^1$ is as defined above, Y represents a $-OR^2$ group, $-OSiR^3_3$ group, $-OAlR^4_2$ group, $-NR^5_2$ group, $-SiR^6_3$ group or $-N(R^7)AlR^8_2$ group, n is 1 to 2, $R^2$, $R^3$, $R^4$ and $R^8$ represent a methyl group, ethyl group, isopropyl group, isobutyl group, cyclohexyl group, phenyl group or the like, $R^5$ represents a hydrogen atom, methyl group, ethyl group, isopropyl group, phenyl group, trimethylsilyl group or the like, and $R^6$ and $R^7$ represent a methyl group, ethyl group or the like.).

Specifically, the following compounds are listed.

(1) Compounds of $R^1_n Al(OR^2)_{3-n}$, for example, dimethylaluminum methoxide, diethylaluminum ethoxide, diisobutylaluminum methoxide and the like, (2) Compounds of $R^1_n Al(OSiR^3_3)_{3-n}$, for example $Et_2Al(OSiMe_3)$, (iso-Bu)$_2$Al(OSiMe$_3$), (iso-Bu)$_2$Al(OSiEt$_3$) and the like, (3) Compounds of $R^1_n Al(OAlR^4_2)_{3-n}$, for example $Et_2AlOAlEt_2$, (iso-Bu)$_2$AlOAl(iso-Bu)$_2$, and the like, (4) Compounds of $R^1_n Al(NR^5_2)_{3-n}$, for example Me$_2$AlNEt$_2$, Et$_2$AlNHMe, Me$_2$AlNHEt, Et$_2$AlN(SiMe$_3$)$_2$, (iso-Bu)$_2$AlN(SiMe$_3$)$_2$, and the like, (5) Compounds of $R^1{}_nAl(SiR^6{}_3)_{3-n}$, for example (iso-Bu)$_2$AlSiMe$_3$, and the like, (6) Compounds of $R^1{}_nAl(N(R^7)AlR^8{}_2)_{3-n}$, for example Et$_2$AlN(Me)AlEt$_2$, (iso-Bu)$_2$AlN(Et)Al(iso-Bu)$_2$, and the like.

Among them, trialkylaluminum is preferable, and tri-isobutylaluminum is particularly preferable.

These organoaluminum-oxycompounds (B-2) can be used alone or in combinations of two or more.

(Compound (B-3) Forming ion Pair by Reacting with Metallocene Compound (A))

As the compound (B-3) which is reacted with the metallocene compound (A) to form an ion pair, Lewis acids, ionic compounds and carborane compounds described in JP-A Nos. 1-501950, 1-502036, 3-179005, 3-179006, 3-207703 and 3-207704, U.S. Pat. No. 5,321,106 and the like are listed.

As the Lewis acid, triphenylboron, tris(4-fluorophenyl) boron, tris(p-tolyl)boron, tris(o-tolyl)boron, tris(3,5-dimethylphenyl)boron, tris(pentafluorophenyl)boron, MgCl$_2$, Al$_2$O$_3$, SiO$_2$-Al$_2$O$_3$ and the like are listed.

As the ionic compound, triphenylcarbeniumtetrakis (pentafluorophenyl) borate, tri n-butylammoniumtetrakis (pentafluorophenyl) borate, N,N-dimethylaniliniumtetrakis (pentafluorophenyl) borate, ferroseniumtetra (pentafluorophenyl) borate and the like are listed.

As the carborane compound, dodecaborane, 1-carbaundecaborane, bis n-butylammonium(1-carbedodeca) borate, tri n-butylammonium(7,8-dicarbaundeca) borate, tri n-butylammonium (tridecahydride-7-carbaundeca) borate and the like are listed.

These compounds (B-3) can be used alone or in combinations of two or more.

In the present invention, as the component (B), at least one compound selected from the above-described component (B-1), (B-2) and (B-3) is used, and these can also be combined appropriately. Of them, it is preferable to use at least (B-1) or (B-3) as the component (B).

(Granular Carrier)

In the present invention, the metallocene compound (A) and the component (B) as described above are brought into contact with a granular carrier, to allow the granular carrier to support the metallocene compound (A) and cocatalyst component (B), to be used as a metallocene-based supporting catalyst (solid catalyst).

As the granular carrier, a granular or fine particle solid having a particle diameter from 10 to 300 $\mu$m, preferably from 20 to 200 $\mu$m are used. It is desirable that the specific surface area of this granular carrier is usually from 50 to 1000 m$^2$/g, and the pore volume is from 0.3 to 2.5 cm$^3$/g.

As this granular carrier, porous inorganic oxides are preferably used, and specifically, SiO$_2$, Al$_2$O$_3$, MgO, ZrO$_2$, TiO$_2$, B$_2$O$_3$, CaO, ZnO, BaO, ThO$_2$ and the like, or mixtures or composites containing these compounds, for example, SiO$_2$—MgO, SiO$_2$—Al$_2$O$_3$, SiO$_2$—TiO$_2$, SiC$_2$—V$_2$O$_5$, SiO$_2$—Cr$_2$O$_3$, SiO$_2$—TiO$_2$—MgO and the like, are used. Among them, those essentially consisting of SiO$_2$ and/or Al$_2$O$_3$ are preferable.

The above-mentioned inorganic oxide may contain carbonates, sulfates, nitrates, oxide components such as Na$_2$CO$_3$, K$_2$CO$_3$, CaCO$_3$, MgCO$_3$, Na$_2$SO$_4$, Al$_2$(SO$_4$)$_3$, BaSO$_4$, KNO$_3$, Mg(NO$_3$)$_2$, Al(NO$_3$)$_3$, Na$_2$O, K$_{2O}$, Li$_2$O and the like in small amount.

As the granular carrier, an organic compound can also be used, and for example, (co)polymers produced by using as the main component an $\alpha$-olefin having 2 to 14 carbon atoms such as ethylene, propylene, 1-butene, 4-methyl-1-pentene and the like, or polymers or copolymers produced by using the main component vinylcyclohexane, or styrene, can be used.

It is desirable to conduct the contact between the granular carrier and the above-mentioned catalyst components at a temperature usually from −50 to 150° C., preferably from −20 to 120° C., for from 1 minute to 50 hours, preferably from 10 minutes to 25 hours.

In the solid catalyst prepared as described above, it is desirable that the metallocene compound (A) is supported in an amount of from $5 \times 10^{-6}$ to $5 \times 10^{-4}$ gram atom, preferably from $10^{-5}$ to $2 \times 10^{-4}$ gram atom in terms of transition metal atoms, per g of the granular carrier, and the component (B) is supported in an amount of from $10^{-3}$ to $5 \times 10^{-2}$ gram atom, preferably from $2 \times 10^{-3}$ to $2 \times 10^{-2}$ gram atom in terms of an aluminum atom or boron atom, per g of the granular carrier.

Further, in the present invention, the solid catalyst as described above can be itself used in polymerzation, however, an olefin can be pre-polymerized on the solid catalyst to form a pre-polymerized catalyst to be used. When the pre-polymerized catalyst is used, the amount of fine powders produced in copolymerization is small, and a polyolefin composition, for example, a linear low density polyethylene composition excellent in particle properties can be produced.

In the present invention, it is desirable that a solid catalyst or a pre-polymerized catalyst is used in an amount of $10^{-8}$ to $10^{-3}$ gram atom/liter, particularly, $10^{-7}$ to $10^{-4}$ gram atom/liter, in terms of transition metal/liter (polymerization volume).

When a pre-polymerized catalyst is used, the component (B) may or may not be used, however, if necessary, can be used in such amount that the atomic ratio of aluminum or boron in the component (B) to a transition metal in the polymerization system (Al or B/transition metal) is from 5 to 300, preferably from 10 to 200, further preferably from 15 to 150.

Effect of the Invention

According to the present invention, a polyolefin composition having a narrow composition distribution and narrow molecular weight distribution, for example an LLDPE composition having a narrow composition distribution and narrow molecular weight distribution, can be obtained. Further, sheeting in the reactor can be prevented, and a polyolefin composition such as an LLDPE composition or the like can be produced stably with high productivity.

EXAMPLES

The following examples will illustrate the present invention further specifically, but do not limit the scope of the present invention.

Examples 1 to 5, Comparative Examples 1, 2

Ethylene and 1-hexene were copolymerized in the first fluidized bed reactor and the second fluidized bed reactor of the polymerization apparatus having two fluidized bed reactors as shown in FIG. 1.

A catalyst system composed of zirconocene and methylalumoxane was fed to the first fluidized bed reactor. The copolymer obtained in the first fluidized bed reactor was introduced together with an accompanying gas into the second fluidized bed reactor via a transport line (transport line 25 in FIG. 1). In the case of polymerization in the second fluidized bed reactor, it was conducted in the presence of the copolymer obtained in the first fluidized bed reactor.

The polymerization was conducted continuously, after the polymerization vessel reached to equivalent condition as shown in Table 1. The feeding amount of 1-hexene was so appropriately controlled that a copolymer having the density shown in Table 1 was obtained.

As the saturated aliphatic hydrocarbon, isopentane was used. Into the first fluidized bed reactor, isopentane was fed from a feeding line (feeding line 12 in FIG. 1), and the feeding amount is regulated to control the concentration of isopentane in the first fluidized bed reactor.

Into the second fluidized bed reactor, isopentane was fed from the first fluidized bed reactor through the transport line (transport line 25 in FIG. 1), while, isopentane was fed directly also from the feeding line (feeding line 22 in the FIG. 1). The concentration of isopentane in the second fluidized bed reactor was controlled by regulating the amount of isopentane fed from the feeding line.

In Comparative Example 1, isopentane was not fed into the first fluidized bed reactor and the second fluidized bed reactor, and isopentane was not introduced also into the transport line. In Comparative Example 2, isopentane was not introduced into the transport line.

Thus obtained LLDPE composition was subjected to measurements to obtain physical properties shown in Table 1. In the table, the melt index was measured at 190° C. under a load of 2.16 kg according to ASTM D 1238. The density was measured according to ASTM D 150E. Regarding NNI (Non Newtonian Index), a melt flow curve at 100° C. was drawn, and the ratio of the shear speed $r_2$ when the shear stress was $2.4 \times 10^6$ dyn/cm$^2$ to the shear speed $r_1$ when the shear stress was $0.4 \times 10^6$ dyn/cm$^2$ ($r_2/r_1$) was obtained. Smaller shear ratio indicates narrower molecular weight distribution of the copolymer composition.

In Examples 1 to 4, sheeting did not occur even if the operation was continued for 30 days and operation for a long period of time was possible. On the other hand, in Comparative Example 1, sheeting occurred in a solid-gas separator (solid-gas separator 31 in FIG. 1) in a continuous operation for 10 days and efficiency of transportation lowered, consequently, there occurred a need to terminate the operation and to conduct cleaning.

From comparisons between Examples 2 to 4 with Comparative Example 1 and with Example 1 and, Example 5 with Comparative Example 2, it is known that a polyolefin composition having a narrow molecular weight distribution can be obtained by controlling the ratio of the concentration ($C_2$) of a saturated aliphatic hydrocarbon in a reactor of a second stage to the concentration ($C_1$) of a saturated aliphatic hydrocarbon in a reactor of a first stage ($C_2/C_1$) within the range specified by the present invention.

TABLE 1

|  | Comparative Example 1 | | Example 1 | | Example 2 | | Example 3 | |
| --- | --- | --- | --- | --- | --- | --- | --- | --- |
|  | Reactor 1 | Reactor 2 | Reactor 1 | Reactor 2 | Reactor 1 | Reactor 2 | Reactor 1 | Reactor 2 |
| Reaction conditions | | | | | | | | |
| Pressure (MPaG) | 1.6 | 2.2 | 1.6 | 2.2 | 1.6 | 2.2 | 1.6 | 2.2 |
| Temperature (° C.) | 75 | 85 | 75 | 85 | 75 | 85 | 75 | 85 |
| Ethylene partial pressure (MPaG) | 1.1 | 1.5 | 1.1 | 1.5 | 1.1 | 1.5 | 1.1 | 1.5 |
| Concentration of isopentane in reactor (mol %) | 0 | 0 | 2.0 | 0.2 | 2.0 | 0.4 | 2.0 | 1.0 |
| Concentration of isopentane in feeding line (mol %) | 0 | | 0.1 | | 0.2 | | 1.0 | |
| Ratio of concentration of isopentane | 0 | | 0.10 | | 0.20 | | 0.50 | |
| Bed weight (t) | 60 | 70 | 60 | 70 | 60 | 70 | 60 | 70 |
| Production speed (t/h) | 11.8 | 8 | 10.7 | 6.7 | 12.4 | 8.4 | 12.4 | 8.4 |
| Residence time (hr) | 5.1 | 3.5 | 5.6 | 4.0 | 4.8 | 3.4 | 4.8 | 3.4 |
| Ratio of production speed (% by weight) | 60 | 40 | 61 | 39 | 60 | 40 | 60 | 40 |
| Physical properties of composition | | | | | | | | |
| MFR (g/10 min) | 0.53 | 2.4 | 0.53 | 2.4 | 0.53 | 2.4 | 0.53 | 2.4 |
| Density (kg/cm$^3$) | 913 | 925 | 913 | 925 | 913 | 925 | 913 | 925 |
| NNI | 29.5 | | 29.4 | | 25.4 | | 24.9 | |

|  | Example 4 | | Comparative Example 2 | | Example 5 | |
| --- | --- | --- | --- | --- | --- | --- |
|  | Reactor 1 | Reactor 2 | Reactor 1 | Reactor 2 | Reactor 1 | Reactor 2 |
| Reaction conditions | | | | | | |
| Pressure (MPaG) | 1.6 | 2.2 | 1.6 | 2.2 | 1.6 | 2.2 |
| Temperature (° C.) | 75 | 85 | 70 | 85 | 70 | 85 |

TABLE 1-continued

| | | | | | | |
|---|---|---|---|---|---|---|
| Ethylene partial pressure (MPaG) | 1.1 | 1.5 | 1.1 | 1.4 | 1.1 | 1.4 |
| Concentration of isopentane in reactor (mol %) | 2.0 | 4.0 | 16.0 | 1.0 | 16.0 | 4.0 |
| Concentration of isopentane in feeding line (mol %) | | 2.0 | | 0 | | 0 |
| Ratio of concentration of isopentane | | 2.0 | | 0.06 | | 0.3 |
| Bed weight (t) | 60 | 70 | 0.10 | 0.11 | 0.10 | 0.11 |
| Production speed (t/h) | 10.5 | 6.9 | 0.020 | 0.013 | 0.021 | 0.014 |
| Residence time (hr) | 5.7 | 4.0 | 5.0 | 3.3 | 4.8 | 3.1 |
| Ratio of production speed (% by weight) | 60 | 40 | 60 | 40 | 60 | 40 |
| Physical properties of composition | | | | | | |
| MFR (g/10 min) | 0.53 | 2.4 | 0.53 | 2.4 | 0.53 | 2.4 |
| Density (kg/cm$^3$) | 913 | 925 | 903 | 915 | 903 | 915 |
| NNI | | 21.3 | | 24.0 | | 20.2 |

What is claimed is:

1. A method of producing a polyolefin composition comprising copolymerizing at least two olefins selected from ethylene or α-olefins having 3 to 20 carbon atoms using at least two gas phase fluidized bed reactors in the presence of a transition metal compound catalyst, wherein copolymerization of the reactor in a second or later stage is conducted in the presence of a copolymer produced in the previous stages, and wherein a saturated aliphatic hydrocarbon exists in each reactor in a concentration from 0.1 to 30 mol %, and the ratio of the concentration ($C_2$) of a saturated aliphatic hydrocarbon in a reactor of a second stage to the concentration ($C_1$) of a saturated aliphatic hydrocarbon in a reactor of a first stage ($C_2/C_1$) is 0.13 or more.

2. The method of producing a polyolefin composition according to claim 1 wherein a saturated aliphatic hydrocarbon having 2 to 10 carbon atoms is introduced to a fluidized bed of each reactor so that the concentration thereof in a reactor is in the range from 0.1 to 20 mol % and the ratio of a concentration ($C_2$) of the saturated aliphatic hydrocarbon in a reactor of a second stage to a concentration ($C_1$) of the saturated aliphatic hydrocarbon in a reactor of a first stage ($C_2/C_1$) is 0.13 or more, and ethylene and an α-olefin having 3 to 20 carbon atoms are copolymerized in the presence of a metallocene-based supporting catalyst, to produce a linear low density polyethylene composition.

3. The method of producing a polyolefin composition according to claim 1 wherein a polyethylene of a higher molecular weight having a melt index in the range from 0.01 to 50 g/10 min. and a density in the range from 0.860 to 0.950 g/cm$^3$ is produced in ore reactor, and a polyethylene of a lower molecular weight having a melt index in the range from 0.5 to 3000 g/10 min. and a density in the range from 0.900 to 0.975 g/cm$^3$ is produced in another reactor, to give a composition in which the weight ratio of the polyethylene of a higher molecular weight to the polyethylene of a lower molecular weight is in the range from 30:70 to 80:20.

4. The method of producing a polyolefin composition according to claim 1 wherein a polyethylene of a higher molecular weight having a melt index in the range from 0.01 to 50 g/10 min. and a density in the range from 0.860 to 0.950 g/cm$^3$ is produced in a reactor of a first stage, and a polyethylene of a lower molecular weight having a melt index in the range from 0.5 to 3000 g/10 min. and a density in the range from 0.900 to 0.975 g/cm$^3$ is produced in a reactor of a second stage, to give a composition in which the weight ratio of the polyethylene of a higher molecular weight to the polyethylene of a lower molecular weight is in the range from 30:70 to 80:20.

5. The method of producing a polyolefin composition according to any of claims 1 through 4 wherein copolymerization is conducted at a temperature in the range from the dew point of a mixed gas containing a polymerization monomer and said saturated aliphatic hydrocarbon present in a fluidized bed of a reactor of a first stage to a temperature 5° C. higher than the dew point.

6. The method of producing a polyolefin composition according to any of claims 1 through 4 wherein the ration of a concentration ($C_2$) of a saturated aliphatic hydrocarbon in a reactor of a second stage to a concentration ($C_1$) of saturated aliphatic hydrocarbon in a reactor of a first stage ($C_2/C_1$) is in the range from 0.13 to 20.

7. The method of producing a polyolefin composition according to any of claims 1 through 4 wherein copolymerization is conducted of a saturated aliphatic hydrocarbon in a mixed gas in one reactor to be higher than the concentrations of saturated aliphatic hydrocarbons in mixed gases in reactors of the previous stage.

8. A method of producing a polyolefin composition comprising polymerizing or copolymerizing at least one olefin selected from ethylene and α-olefins having 3 to 20 carbon atoms using at least two gas phase fluidized bed reactors, wherein a saturated aliphatic hydrocarbon is allowed to exist in a transport line for transporting a polymer particle extracted from a fluidized bed reactor in the previous stage to a fluidized bed reactor in the subsequent stage, and the concentration of a saturated aliphatic hydrocarbon in the corresponding transport line is in the range from 0.1 to 30 mol %.

9. The method of producing a polyolefin composition according to claim 8 wherein all or a part of said saturated aliphatic hydrocarbon is fed to a fluidized bed reactor, and introduced into a transport line together with a polymer particle.

* * * * *